(12) United States Patent
Shure et al.

(10) Patent No.: US 8,234,307 B1
(45) Date of Patent: Jul. 31, 2012

(54) DETERMINING SEARCH CONFIGURATIONS FOR NETWORK SITES

(75) Inventors: Steven D. Shure, Seattle, WA (US); Nitin Arora, Bellevue, WA (US); Vinayak R. Hegde, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 417 days.

(21) Appl. No.: 12/414,812

(22) Filed: Mar. 31, 2009

(51) Int. Cl.
*G06F 17/30* (2006.01)
*G06F 3/048* (2006.01)
*G06Q 30/00* (2012.01)

(52) U.S. Cl. .................. 707/793; 707/706; 715/780

(58) Field of Classification Search .................. 707/729, 707/793
See application file for complete search history.

(56) References Cited

U.S. PATENT DOCUMENTS

| | | | |
|---|---|---|---|
| 2003/0167209 A1* | 9/2003 | Hsieh | 705/26 |
| 2004/0122808 A1* | 6/2004 | Martin et al. | 707/3 |
| 2005/0165789 A1* | 7/2005 | Minton et al. | 707/10 |
| 2006/0053095 A1* | 3/2006 | Koch et al. | 707/3 |

OTHER PUBLICATIONS

Frankie Poon & Kostas Kontogiannis, "i-Cube: A Tool-set for the Dynamic Extraction and Integration of Web Data Content", ISEC 2001, LNCS 2040, Springer-Verlag publishers, 2001, pp. 98-115.*
Steven N. Minton, et al., "Trainability: Developing a Responsive Learning System", in Proceedings of IIWeb 2003, pp. 27-32.*
Liangcai Shu, et al., "Querying Capability Modeling and Construction of Deep Web Sources", WISE 2007, LNCS 4831, Springer-Verlag publishers, 2007, pp. 13-25.*
Michael Bolin, "End-User Programming for the Web", Masters Thesis, Massachusetts Institute of Technology, May 2005.*

* cited by examiner

*Primary Examiner* — Cheryl Lewis
*Assistant Examiner* — Scott A Waldron
(74) *Attorney, Agent, or Firm* — Thomas, Kayden, Horstemeyer & Risley, LLP (57) ABSTRACT

Various embodiments are described for determining a search configuration for a network site. A plurality of network sites are accessed in a server, and for each of the network sites, it is determined whether a search text box exists in a network page of the network site. A search is automatically performed using a search term in the search text box if the search text box exists in the network page and it is determined whether a search term can be identified in association with a search result network page generated from the search. A search configuration is stored that indicates where the search term can be identified in a future network page resulting from a search performed on the network site.

8 Claims, 6 Drawing Sheets

| Website | # | Status | URL | Kwd | delim | Search Element ID |
|---|---|---|---|---|---|---|
| http://www.google.com | 1 | Updated | http://www.google.com/search?hl=en&q=cyberwidget&btn... | q | & | |
| http://www.yahoo.com | 1 | Updated | http://search.yahoo.com/search;_ylt=A0o...87UF?p=cyberwidget&ei=UTF-8&iscqry=&fr=sfp... | p | & | |
| http://www.dogpile.com | 1 | Updated | http://www.dogpile.com/dogpile/ws/results/Web/blue/1/417/TopNavigation/Relevance/iq=true/zoom=off/_iceUrlFlag=7... | | | xyzPage_SearchBoxTop_abc |

| Website | # | Status | URL | Kwd | delim | Search Element ID |
|---|---|---|---|---|---|---|
| http://www.google.com | 1 | Updated | http://www.google.com/search?hl=en&q=cyberwidget&btn... | q | & | |
| http://www.yahoo.com | 1 | Updated | http://search.yahoo.com/search;_ylt=A0o...87UF?p=cyberwidget&ei=UTF-8&iscqry=&fr=sfp... | p | & | |
| http://www.dogpile.com | 1 | Updated | http://www.dogpile.com/dogpile/ws/results/Web/blue1/417/TopNavigation/Relevance/iq=true/zoom=off/_iceUrlFlag=7... | | | xyzPage_SearchBoxTop_abc |

DETERMINING SEARCH CONFIGURATIONS FOR NETWORK SITES

BACKGROUND

Merchants who sell their products online face significant competition. A customer who searches for a specific product via a web search or other approach may find multiple online merchants who sell the same product. In some cases, even the customers who are most loyal to a given merchant may decide to purchase a product from an alternative online merchant from time to time even though the given merchant may offer similar products at similar terms.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The following description sets forth various steps and/or operations that may be performed by various computer components. It is understood that such components may be grouped in a single location or distributed over a large area. Such components may include, for example, computer processing devices, memory devices, display devices, input devices, and other systems and devices. Where such components may be distributed, they may communicate with each other over various networks or other communications links.

Figure 1:
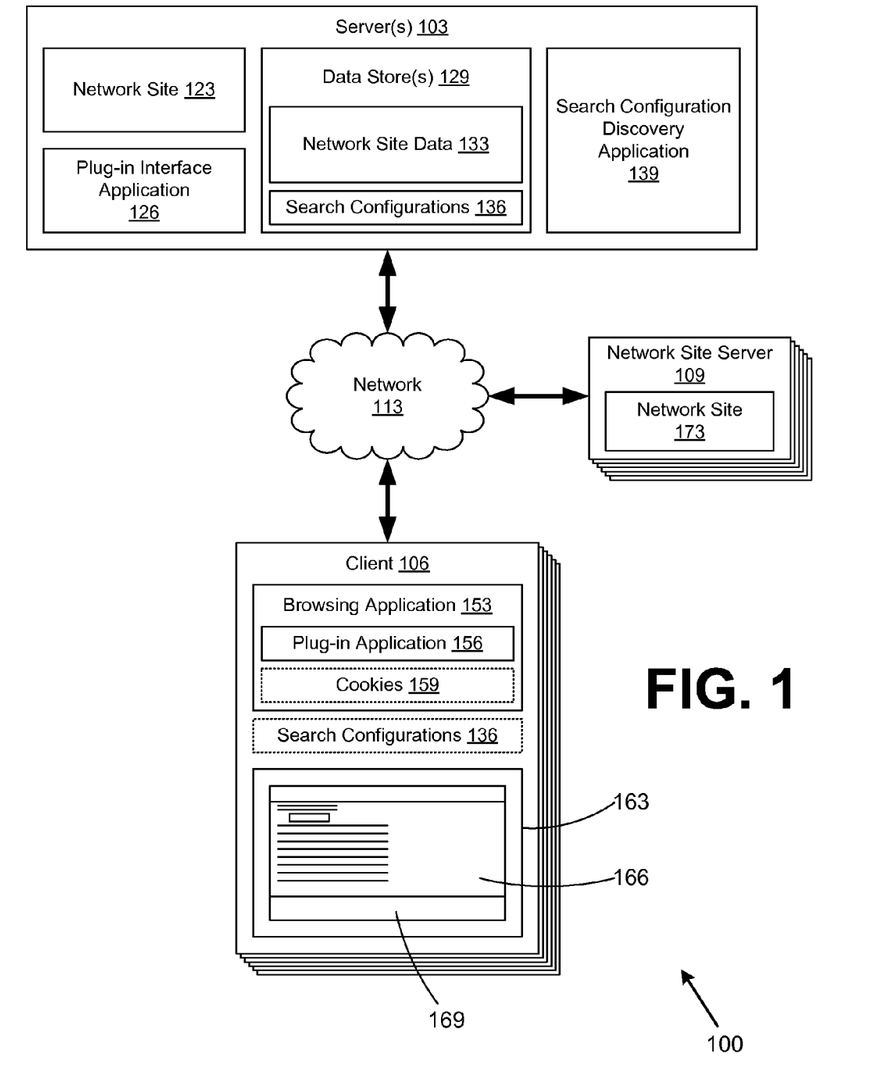
FIG. 1 is a drawing of one example of a data communications network according to various embodiments of the present disclosure.

With reference to FIG. 1, shown is a data communications network 100 that includes various components. Specifically, the data communications network 100 includes one or more servers 103, one or more clients 106, and one or more network site servers 109. The servers 103, clients 106, and network site servers 109 are in data communication with each other through a network 113. The network 113 may comprise, for example, the Internet, intranets, extranets, wide area networks (WANs), local area networks (LANs), wired networks, wireless networks, or other suitable networks, etc., or any combination of two or more such networks.

The server 103 may comprise, for example, a server computer or like system. The server 103 may represent multiple servers arranged, for example, in one or more server banks or other arrangements. Such servers 103 may be located in a single installation or may be dispersed among many different geographical locations. For purposes of convenience, the server 103 is referred to herein in the singular. However, in one embodiment, the server 103 represents a plurality of servers arranged as described above.

Various applications are implemented on the server 103 according to various embodiments. Such applications include, for example, one or more applications that facilitate the operation of a network site 123 and a plug-in interface application 126. The plug-in interface application 126 is implemented in order to communicate with certain plug-ins on the client 106 as will be described. The network site 123 facilitates the operation of a network site such as that presented by an online merchant or other type of network site as will be described.

Also stored within the server 103 or otherwise accessible to the server 103 is a data store 129. The data store 129 may comprise, for example, a database or other type of data storage system. Stored within the data store 129 are network site data 133, search configurations 136, and other data as can be appreciated. The network site data 133 is employed by the network site 123 to generate the various network pages associated with the network site 123 as can be appreciated. Also, the network site data 133 may include various other data that facilitates online transactions and other functions as will be described. The search configurations 136 relate to how other network sites facilitate the performance of network searches as will be described.

Also implemented on the server 103 is a search configuration discovery application 139. The search configuration discovery application 139 is executable in the server 103 in order to identify search configurations 136 for various network sites. The search configurations 136 are employed in obtaining search terms from a search result as will be described.

Each of the clients 106 may comprise, for example, a processor-based system such as computer system. Such a computer system may be embodied in the form of a desktop computer, a laptop computer, a personal digital assistant, a cellular telephone, set-top box, music players, web pads, tablet computer systems, or other devices with like capability. The client 106 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include display devices, indicator lights, speakers, printers, etc. Specific display devices may be, for example, cathode ray tubes (CRTs), liquid crystal display (LCD) screens, gas plasma-based flat panel displays, LCD projectors, or other types of display devices, etc.

Various applications are executed on the client 106 according to various embodiments. For example, the client 106 includes a browsing application 153. The browsing application 153 may comprise any one of various different technologies that facilitate access to network pages or other content available on the network 113. To this end, for example, a browsing application 153 may comprise a browser such as, for example, INTERNET EXPLORER® marketed by Microsoft Corporation of Redmond, Wash., MOZILLA FIREFOX® which is promulgated by Mozilla Corporation of Mountain View, Calif., or other similar applications. According to one embodiment, associated with the browsing application 153 is a plug-in application 156. The plug-in application 156 is installed and executed in coordination with the operation of the browsing application 153. Alternatively, the functionality of the plug-in application 156 may be included as part of the browsing application 153 or may be executed as an application in conjunction with the operation of the browsing application 153 in some other manner.

Still further, the plug-in application 156 may be associated with other applications beyond browsing applications 153. For example, the plug-in application 156 may be associated with calendar applications, word processing applications, spreadsheet applications, and other applications. Although a browsing application 153 are specifically referred to herein during the below discussion of the various embodiments, it is understood that such a browsing application 153 is cited as a mere example of the many applications to which the functionality of the plug-in application 156 may apply.

The browsing application 153 may also include cookies 159 that are downloaded from various network sites and are stored in the client 106. In one embodiment, a cookie 159 may provide for the authentication or identification of a user with respect to the network site 123 on the server 103. In addition, a copy of the search configurations 136 may be downloaded from the server 103 and stored in memory in, or accessible to, the client 106. Such search configurations 136 are accessed by the plug-in application 156 from time to time as will be described. In addition, many other applications may be executed on the client 106 as can be appreciated.

The client 106 includes a display device 163 that may comprise any one of the different types of display devices described above. Upon execution in the client 106, the browsing application 153 causes a user interface 166 to be generated on the display device 163 as will be described. The user interface 166 includes a window 169 that is generated by the plug-in application 156.

The network site server 109 may comprise, for example, a server computer or like system. The network site server 109 may represent multiple servers arranged, for example, in one or more server banks or other arrangements. Such servers may be located in a single installation or may be dispersed among many different geographical locations. For purposes of convenience, the network site server 109 is referred to herein in the singular. However, in one embodiment, the network site server 109 represents a plurality of servers arranged as described above.

The network site server 109 is employed to host one or more network sites 173. The network site 173 may comprise, for example, a website or other type of site that facilitates browser access to information to applications such as the browsing application 153. To this end, the network site 173 is a collection of network pages such as web pages that may include images, videos, text, or other digital assets. A given network site 173 may be hosted on one or more network site servers 109 and is accessible through the network 113. The pages that make up the network site 173 may be written using an appropriate language such as any one of various versions of hypertext markup language (HTML) and may be accessible using a suitable protocol such as hyper text transfer protocol (HTTP). Alternatively, other network sites 173 may be created using other programming languages, and the network sites 173 may be accessed using other protocols.

In one embodiment, the pages of the network site 173 can be accessed using a common root uniform resource locator (URL). The common root URL may point to a "home page" associated with the network site 173. The various pages of the network site 173 may be organized into a hierarchy and may be linked together by way of hyperlinks or other types of links. The hyperlinks or other links may control how a user perceives the overall structure of the network site 173.

According to one embodiment, the network site 173 comprises a commercial website, for example, that may be manipulated to purchase products over the network 113. As contemplated herein, the term "products" includes physical goods, services, digital media items, and/or any other type of product. The network site 173 may be static or dynamic. Where the network site 173 comprises a commercial website, it is likely that the network pages making up the network site 173 are generated dynamically, where data associated with the network pages generated is stored in a database or other data storage structure as can be appreciated.

In addition, various applications (not shown) may be implemented in the servers 103 or 109 to facilitate communication with the clients 106. Such applications may comprise, for example, a web server application or other type of application as can be appreciated. Where such applications comprise a web server application, for example, the servers 103 or 109 may communicate with the clients 106 using hypertext transfer protocol (HTTP), secure HTTP, and/or simple object access protocol (SOAP). Such communication at the application layer may, for example, be expressed in extensible markup language (XML). Alternatively, other protocols beyond the above protocols may be employed.

Next, a general discussion of the operation of the various components in the data communications network 100 is provided. To begin, assume that an operator of the network site 123 wishes to receive the patronage of users who operate various clients 106. For example, where the network site 123 comprises the network presence of a merchant, the operator of the network site 123 may wish for users to access their network site 123 as opposed to the online presence of other merchants via various network sites 173.

In one embodiment, the network site 123 facilitates the download of the plug-in application 156 from the server 103 to the client 106. Also, the network site 123 may facilitate the download of one or more cookies 159 to the client 106 that may be used to authenticate a given user who purchases products from, or otherwise interacts with, the network site 123. The plug-in application 156 is executed in conjunction with the operation of the browsing application 153 in order to present a window 169 in the user interface 166. Presented in the window 169 is subject matter associated with the network site 123 while the user undertakes browsing activity using the browsing application 153.

To this end, the plug-in application 156 is configured to determine the nature of the browsing activity performed using the browsing application 153 and report the same to the plug-in interface application 126. The plug-in interface application 126 interfaces with the network site 123 to obtain information relevant to the browsing activity and send the same back to the client 106 to be rendered within the window 169 generated by the plug-in application 156 in the user interface 166.

In one embodiment, the plug-in application 156 is configured to identify search terms from searches performed using the browsing application 153 by a user. The search terms may be obtained using a respective one of the search configurations 136 as will be described. Once search terms are obtained based upon the browsing activity performed, the same are sent to the plug-in interface application 126 that interacts with the network site 123 to obtain content that is relevant to the search terms obtained by the plug-in application 156. In response, the network site 123 provides content relevant to the search terms that is sent back to the client 106 to be presented within the window 169 generated by the plug-in application 156.

In order to obtain one or more search terms based upon the browsing activity, the plug-in application 156 is configured to detect whether a search is being performed in association with a given network site 173 by a user. Such a search may be performed by a user entering search terms into a search text box associated with a given network page. Such search network pages may comprise, for example, search pages such as those presented by GOOGLE™, YAHOO!®, or other common searching network sites 173. Given the domain within which the search terms are entered, a search configuration 136 associated with the network site 173 in question may be looked up in the search configurations 136.

Each search configuration 136 comprises data that facilitates the identification of a search term from a search result generated by a search. Such a search result may comprise, for example, a search result network page that is associated with the given network site 173. Such a search result network page may include a list of identified network sites 173 that provide information relevant to the search itself as can be appreciated. Alternatively, a search result network page may include a listing of products for a network site 173 operated by a merchant. Based on the information in a search result network page or other search result, the plug-in application 156 is configured to identify the search terms employed using a respective search configuration 136 generated for the corresponding network site 173.

In one embodiment, the search terms may be identified within the search result URL associated with the search result network page. Alternatively, the search terms may be identified within a search text box displayed in a search result network page. It is known that some search result network pages include a search text box that sets forth the search terms, whereas others do not display the search terms in such a manner. Also, some search result URLs include search terms that may be reliably identified and extracted, whereas other search result URLs do not provide an indication as to which terms within the URL are search terms. The search configurations 136 generated for respective network sites 173 facilitate the identification of the search terms by the plug-in application 156 when manipulating such network sites 173.

In addition, the plug-in application 156 may be configured to access cookies 159 or other data stored in the client 106 during past interaction with the network site 123 by the browsing application 153. The cookies 159 or other data provide authentication information that identifies a user to the network site 123. The plug-in application 156 may communicate identity information associated with a cookie 159 or other data to the network plug-in interface application 126 along with the search terms as described.

To the extent that the identity of a user may be useful relative to the functions of the network site 123, then such information may be employed in generating the content to be displayed in the window 169 within the user interface 166. For example, where the network site 123 is a merchant network site, a user identity may facilitate an examination of a past purchase history for the user based on the identity of the user indicated by the information from the respective cookie 159 accessed by the plug-in application 156. Such past purchase history may provide information from which product purchase recommendations may be generated in light of the search terms received from the client 106. Thus, it may be possible that the content that is transmitted back to the plug-in application 156 based upon the search terms would be of greater relevance to the individual user given that their past purchase history or other personal information may be known, due to the fact that their identity was revealed along with the search terms.

In order to provide for the search configurations 136, the search configuration discovery application 139 is executable in the server 103. The search configuration discovery application 139 is configured to automatically determine how each of the network sites 173 expresses a search term in a search result performed on the network site 173. For example, a search configuration 136 may indicate that search terms may be found within a search text box that is displayed in a search result network page. Alternatively, the search configuration 136 may indicate that search terms are included within a search result URL associated with the search result network page in some manner, or the search terms may be identified in some other manner. Once it is identified how a given network site 173 expresses a search term in a given search result, then such information is stored in a search configuration 136 for each of the network sites 173 for future reference.

In order to determine a given search configuration 136, the search configuration discovery application 139 first accesses a network site 173 downloading one or more network pages associated with the network site 173. For each network page downloaded, the search configuration discovery application 139 determines if any potential search text boxes exist within the network page. For each potential search text box determined to exist within a given network page, the search configuration discovery application 139 automatically performs a test search by inputting a test search term therein. Such test search terms are generic or nondescript in nature so that they would reveal a bona fide result regardless of the nature of the subject matter searched. For example, if a search text box facilitates a search on the Internet, then just about any term would provide results. However, if the search text box facilitates a search through products in a product catalog, then the test search terms should be of a nature that would render a result in such a context. In one example, test search terms may comprise colors such as "red," "blue," or "black," etc. For each potential text search box, assuming that the text box is in fact a search text box, the search configuration discovery application 139 determines if the test search terms can be identified in association with a search result network page generated from the test search.

Thus, to verify that a given text box is in fact a search text box, the results of the entry of the respective test terms into a given potential search text box are examined. Where such results appear to be an error, it is assumed that the potential search text box was not actually a search text box. Such may be the case, for example, where text boxes are employed to input certain information required by specific parameters of the network site 173 such as, for example, a zip code or other specific information.

However, if a given text box is in fact a search text box, then when a generic search term is entered into the search text box, a bona fide search result is generated. The search result may be examined to determine whether it is an error page or an actual search result. Once it is known that a potential search text box is an actual search text box, and that the search result received was a search result network page, then the search configuration discovery application 139 proceeds to determine whether the search terms can be reliably obtained from the search result.

In one embodiment, the search terms may exist within the search result URL associated with a search result network page generated by the search. To this end, such search terms may be indicated in the search result URL based upon a keyword and the use of delimiters. Alternatively, in other configurations, search terms are included within a search text box associated with a search result network page. In still other embodiments, the search terms may be embodied within a search result in some other manner.

In any event, the search configuration discovery application 139 is configured to determine exactly where search terms may be found within a given search result for a respective network site 173. Once this is determined, the search configuration discovery application 139 stores information in a search configuration 136 for a given network site 173 that facilitates the extraction of search terms from future search result network pages generated by the network site 173.

To this end, the search configurations 136 may include information that facilitates the extraction of search terms from a search result URL or from a text box associated with a search result network page as will be described. In one embodiment, a given search configuration 136 may include examples of a search result URL or an indication of a search element identifier associated with a search text box within a Document Object Model (DOM) that identifies which field contains the search terms within a given search result network page. In addition, each search configuration 136 includes a URL associated with a given network site 173 to associate the respective search configuration 136 with the corresponding network site 173. To this end, the URL may comprise a top level domain or other information.

According to one embodiment, the function of the search configuration discovery application 139 periodically revisits each of the network sites 173 to maintain up-to-date search configurations 136 for each of the network sites 173. Thus, if the way that the search terms are expressed within a search result changes for a given network site 173, the periodic execution of the search configuration discovery application 139 with respect to such a network site 173 ensures that search terms can be reliably extracted from a given search result generated for the network site 173 over time.

In one embodiment, the network site 123 may comprise the online presence of a merchant who sells products over the network 113. In such case, the merchant may employ the search configuration discovery application 139 to generate search configurations 136 for competitor network sites 173. Assume that a user that has installed the plug-in application 156 on the respective client 106. Also assume that such a user accesses a given one of the network sites 173 operated by a competitor to do a search for products to purchase. In such case, the merchant can react by obtaining the search terms and performing their own search of the products within their own catalog within the data store 129 to obtain competitive products that are then presented in the window 169 in the user interface 166.

In this manner, the merchant is able to compete with other network sites 173 more directly. In the case that the user has established a special relationship with the merchant such as, for example, by joining a buyer club that receives special preferences or discounts, or other special treatment, the merchant that operates the network site 123 is able to present products to users via the window 169 in the user interface 166 even though the users may search other network sites 173 for products. To this end, the operator of the network site 173 can leverage the existing relationship with the user and the level of trust that exists with their customer.

The search configurations 136 may be made available to the plug-in application 156 in several ways. In one embodiment, the search configurations 136 may be downloaded from the server 103 to the client 106 upon startup of the browsing application 153 and the plug-in application 156. Alternatively, a request may be sent by the plug-in application 156 to the plug-in interface application 126 for a search configuration 136 each time the browsing application 153 accesses a different network site 173. In response, the plug-in interface application 126 sends a search configuration 136 to the client 106 in response to the request. In another alternative, the search configurations 136 may be downloaded to the client 106 periodically such as once a week or some other time period. Still further, a subset of the most commonly accessed search configurations 136 may be downloaded to the client 106 upon startup of the browsing application 153 periodically or at some other time to reduce the time it takes to obtain a local copy of the search configurations 136. Thereafter, less commonly accessed search configurations 136 may be requested from the server 103 as needed.

Figure 2:
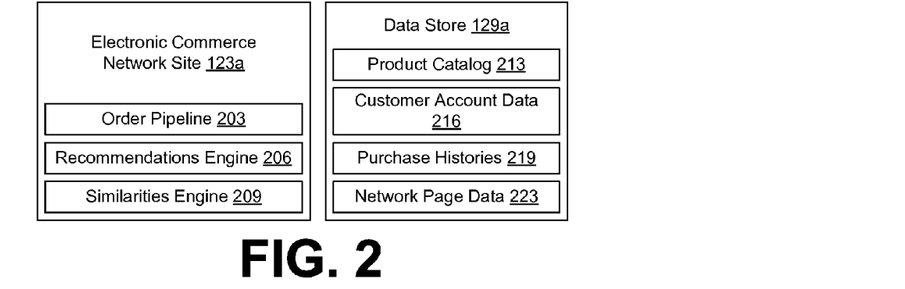
FIG. 2 is a drawing of one example of applications executable in a server in the data communications network of FIG. 1 according to an embodiment of the present disclosure.

With reference to FIG. 2, shown is an example of the network site 123 (FIG. 1) denoted herein as electronic commerce network site 123a and the data store 129 (FIG. 1) denoted herein as data store 129a according to an embodiment of the present disclosure. In this respect, the electronic commerce network site 123a provides for an online presence of a merchant who sells products. The data store 129a includes data that is employed by the electronic commerce network site 123a in conducting online sales. The electronic commerce network site 123a is executed to generate the various network pages and perform other functions associated with an online merchant network site 123. To this end, the electronic commerce network site 123a may be very complex. Such a site is typically configured to generate network pages such as web pages or other content dynamically based upon the actions of a user in browsing through the various links presented.

In addition, the electronic commerce network site 123a may include various subcomponents that perform specific purposes such as an order pipeline 203, a recommendations engine 206, a similarities engine 209, and other components. The order pipeline 203 specifically generates the network pages that guide a customer through the purchase process when purchasing products through the network site 123. The recommendations engine 206 generates recommendations for the purchase of other products based upon a past purchase history of a given customer, the purchases of other individuals, or other information. For example, if many individuals that bought a first product also bought a second product, then the recommendations engine 206 may present such information to a given customer to entice them to purchase the second product. Alternatively, the recommendations engine 206 may examine a purchase history of a given customer to predict whether they may be inclined to purchase certain other items in an attempt to enhance sales.

The similarities engine 209 is executed to present items that are similar to those browsed by an individual in the hopes of presenting items that a customer may wish to purchase based upon a current search performed.

In addition, the various network site data 133 (FIG. 1) that is stored in the data store 129a in association with the operation of the electronic commerce network site 123a includes a product catalog 213, customer account data 216, purchase histories 219, and network page data 223. The product catalog 213 lists those products presented or offered online by a given merchant for purchase by customers. Such product catalog 213 includes detailed information about products, and may also include feedback and other information about products. The customer account data 216 includes specific information about customers such as name, address(es), shipping address (es), payment instrument(s), and other information as can be appreciated. To this end, data embodied in a cookie 159 that is stored in a client 106 may be associated with a given customer account data 216 for a respective customer.

The purchase histories 219 indicate those items or services purchased by a given user in the past. Each purchase history 219 may be associated with a given customer account as can be appreciated. Also, the network page data 223 includes data that is used to generate the various network pages served up by the electronic commerce network site 123*a* in response to browser requests as can be appreciated. Such network page data 223 may include templates for layouts of user interfaces and other information used for the dynamic generation of network pages as can be appreciated.

Figure 3:
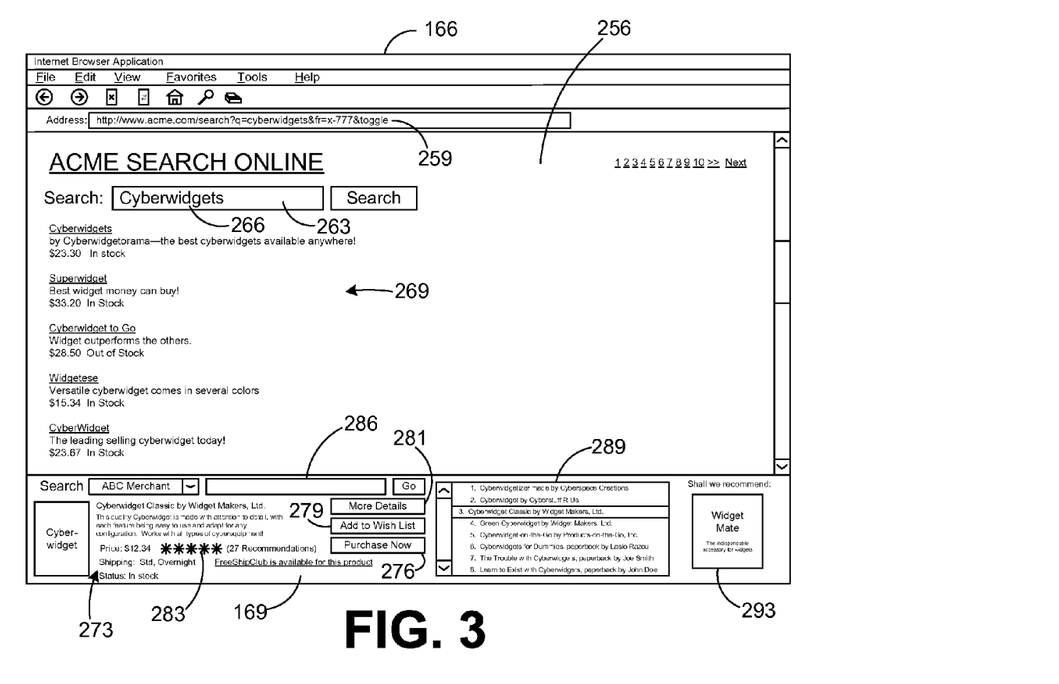
FIG. 3 is a drawing of one example of a user interface presented on a client in the data communications network of FIG. 1 according to an embodiment of the present disclosure.

With reference then to FIG. 3, shown is one example of a user interface 166 generated on a display device 163 (FIG. 1) of a client 106 (FIG. 1) by the browsing application 153 (FIG. 1). The user interface 166 includes the window 169 that is generated as part of the user interface 166 by the operation of the plug-in application 156 (FIG. 1) executed in association with the browsing application 153. In one embodiment, the window 169 may be minimized or maximized as desired by a user. According to one embodiment, the user interface 166 presents a search result that is generated based upon a search performed by a user on a given network site 173 (FIG. 1). To this end, the user interface 166 presents a search result network page 256. The search result network page 256 includes a search result URL 259 that is displayed in an address field of the user interface 166. Also, the search result network page 256 includes a search text box 263.

As shown, a search term 266 is included in the search text box 263 which is part of the search result network page 256. In some situations, it may be the case that a search text box 263 is not included within a search result network page 256 for some network sites 173.

The search result network page 256 also includes a search list 269. The search list 269 may comprise a list of products offered by a given merchant through their network site 173. Alternatively, the search list 269 may include a list of network sites 173 that are relevant to the search term 266 or may include sites that sell products associated with the search term 266. To this end, the search list 269 presented in the search result network page 256 may depend upon the type of network site 173 upon which the search is conducted. For example, network sites 173 that act as search engines such as Yahoo!® and Google™ may generate a search list 269 that lists network sites 173 with information relevant to the search term 266. Alternatively, if the search is performed on a network site 173 associated with a specific merchant such as, for example, Macy's® or Target®, the search list 269 may include a list of products 289 offered by such merchants relevant to the search term 266 as shown in FIG. 3.

In any event, the plug-in application 156 operates to determine the one or more search terms 266 that generated the search result network page 256 for a respective network site 173. To this end, the plug-in application 156 attempts to locate a search configuration 136 from the list of search configurations 136 stored there that is associated with the respective network site 173 currently accessed by the browsing application 153. This may be done by accessing locally stored search configurations 136 or by requesting a search configuration 136 from the server 103 as described above.

Once the respective search configuration 136 is found, the plug-in application 156 may then proceed to obtain or extract the search terms 266 from the search result network page 256 as described above. For example, the search terms 266 may be extracted from the search result URL 259 or the search text box 263 as described above. In one embodiment, the search terms 266 are extracted in a manner that ensures that the search terms 266 are, in fact, the search terms 266 used to generate the search result network page 256. To this end, the search terms 266 are obtained without erroneously extracting personal information about a given customer such as, for example, social security numbers, numbers associated with a payment instruments, or other personal information. Thus, according to one embodiment, the various approaches employed to determine the search terms 266 from a search result such as a search result network page 256 are required to be reliable approaches such that they will not obtain the wrong information that may result in the compromise of personal information.

If we assumed that the network site 123 is an electronic commerce network site, then the content presented in the window 169 may include product information 273 about one or more products presented for purchase. In one embodiment, such information may be presented in association with an offer for the purchase of a product in the window 169. To this end, the product information 273 may comprise, for example, a product name, a written description of the product, a price of the product, an image displaying the product, shipping availability for the product, a promised delivery date, and stocking status in terms of whether the product is in stock or unavailable. In addition, the product information 273 may include other information about a given product.

The content displayed within the window 169 may also include a button or other component that provides a link to the order pipeline 203 to facilitate the purchase of a product. Specifically, the window 169 may include a button 276 that provides a link to a detail page that presents a product for purchase to a user through the browsing application 153. To this end, when one manipulates the button 276, a download may be initiated of a detail page from the electronic commerce network site 123*a* presenting the product for purchase. Note that the detail page may be part of the order pipeline 203 or may simply be part of a product browsing capability of the electronic commerce network site 123*a*.

Still further, the button 276 may be implemented to automatically consummate a purchase of a product without further input by a user. To this end, authentication information is obtained from a cookie 159 or other data to authenticate the user to ensure the avoidance of theft, etc. In such a situation, the electronic commerce network site 123*a* may be configured to automatically implement the sales transaction and initiate the shipment of the purchased product without further interaction by the user. In such case, the electronic commerce network site 123*a* may include prearranged settings and data such as a shipping address and payment instruments entered by the user to facilitate the quick purchase of products at a later time in this manner.

In addition, a wish list button 279 may be presented as a portion of the content of the window 169. The wish list button 279 implements the addition of a product to a wish list maintained in association with the electronic commerce network site 123*a* for a respective customer. Such wish lists may comprise lists of products that a customer may wish to purchase in the future as can be appreciated. When the wish list button 279 is manipulated, the plug-in application 156 may communicate the desire of the user to add the respective product indicated in the window 169 to a wish list for the customer. To this end, a user may be required to enter authentication information such as a username and password, or such information may be obtained from a cookie 159 or other data stored in the client 106 so that the wish list associated with the user may be identified by the electronic commerce network site 123*a*.

Also, a "more details" button 281 may be presented as a portion of the content of the window 169. When manipulated, the more details button 281 facilitates the generation of an additional window or panel that includes greater detail about the current product described by the product information 273. Such an additional window or panel may provide greater product details, accessories for the product, further recommendations, product similarities, feedback about the product from other customers, larger or more detailed images of the product, and other information.

In addition, the content of the window 169 may also include a product rating 283 that is displayed in association with a product presented in the window 169. The product rating 283 is presented in the window 169 as a portion of the content in order to identify how well others rate a given product sold by the merchant who operates the electronic commerce network site 123*a*. Such a product rating 283 may be generated based upon the input of several customers who have purchased the product in the past or may be generated in some other manner as can be appreciated.

The window 169 may also include a search text box 286 within which the user may search the products offered by the electronic commerce network site 123*a*. In this manner, a user may perform a search specifically on the electronic commerce network site 123*a* or other type of network site associated with the window 169 while at the same time searching on other network sites 173 in the other portions of the user interface 166 generated by the browsing application 153. In addition, where given products offered by a merchant may involve different special offers such as free shipping or other capabilities, such information may be displayed as a portion of the window 169.

In addition, a product list 289 may be presented in the window 169 based upon a search performed using the search terms 266. As shown, one of those products listed in the product list 289 is set forth in greater detail in other portions of the window 169. Also, recommendations 293 may be displayed in the window 169 based upon the search term 266 sent to the server 103. Alternatively, the recommendations 293 may be generated based upon a purchase history or other information as described above, where the user may provide personal identification information such as a user name and password or other information obtained from a cookie 159 as described above. In addition, other content items may be included in the window 169 beyond those described.

Figure 4:
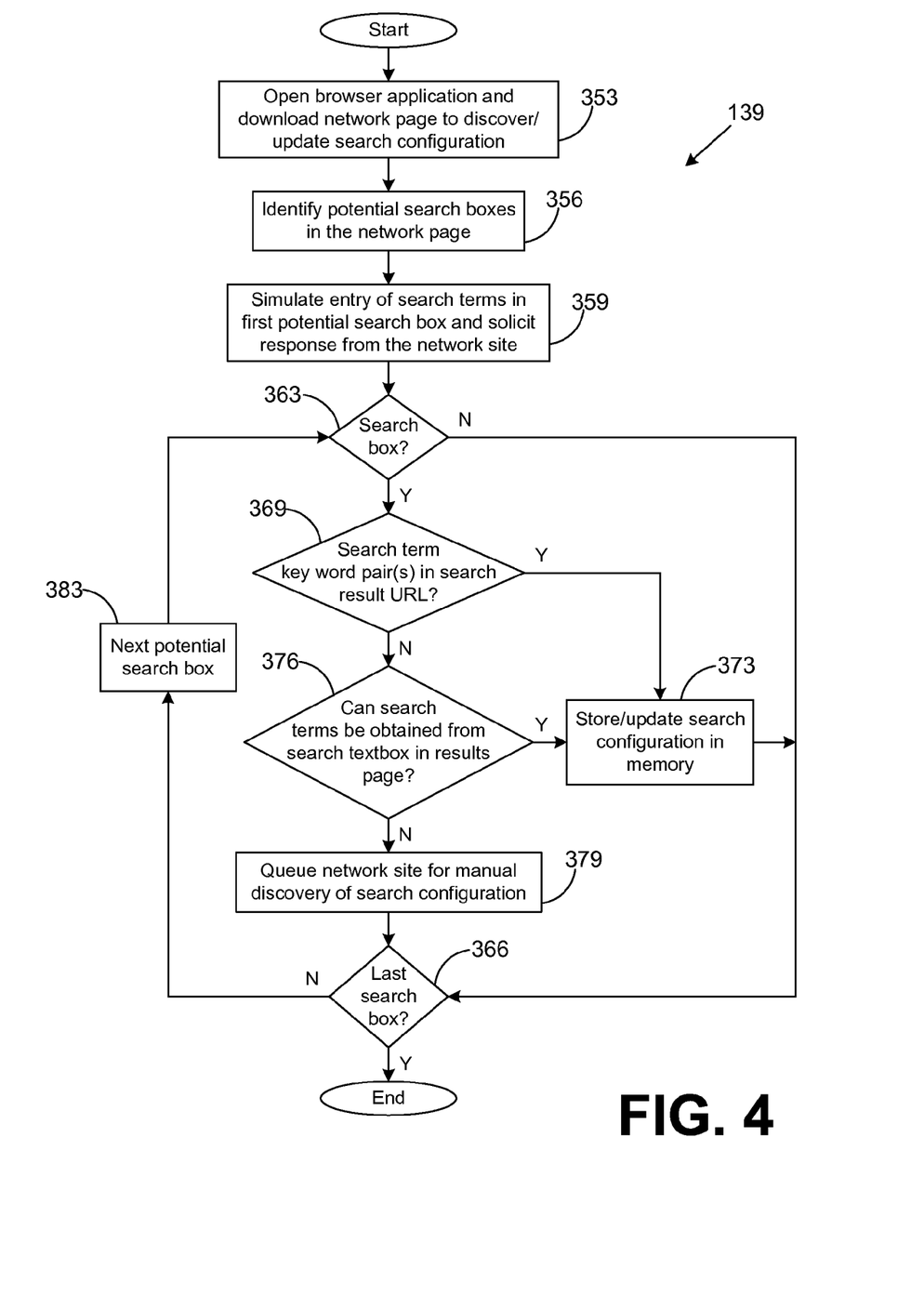
FIG. 4 is a flowchart that illustrates one example of a search configuration discovery application implemented in a server in the data communications network of FIG. 1 according to an embodiment of the present disclosure.

Referring next to FIG. 4, shown is a flowchart that provides one example of the operation of the search configuration discovery application 139 according to an embodiment of the present disclosure. Alternatively, the flowchart of FIG. 4 may be viewed as depicting steps of an example of a method implemented in the server 103 to obtain a search configurations 136 (FIG. 1) for network sites 173.

To begin, in box 353, a browsing application or function associated with the search configuration discovery application 139 or its equivalent is employed to access a network site 173 (FIG. 1) to discover and/or update a search configuration 136 (FIG. 1) associated with such network site 173. Thereafter, in box 356, the search configuration discovery application 139 identifies potential search text boxes 236 (FIG. 2) in a network page of the network site 173 downloaded. In box 359, the search configuration discovery application 139 simulates entry of search terms 266 (FIG. 2) in a first potential search text box and solicits a response from the network site 173.

To this end, in box 356, there may be multiple potential search text boxes identified in the network page 173. The search terms 266 entered into the potential search text box may comprise terminology that is relatively generic that should solicit a proper response from most if not all search text boxes. For example, such terminology may comprise a color such as "red" or other term as mentioned above.

In box 363, the search configuration discovery application 139 determines whether the potential search text box identified in box 359 is in fact a search text box. This may be determined by examining the result received from the network site 173. For example, if the potential search text box required specific information such as, for example, a zip code, then the result might indicate an error stating that the test search terms entered are not in the proper format, i.e. in the format of a zip code. In addition, many other errors may be indicated depending on the nature of the actual potential search text box in which the search terms were entered.

If a potential search box actually is a search text box, then a response should be received from the network site 173 without error. Also, such response may exhibit the characteristics of a proper search result network page 256 as can be appreciated. Assuming that the resulting response from the network site 173 indicates that the potential search text box is not in fact a search text box, then the search configuration discovery application 139 proceeds to box 366. Otherwise, the search configuration discovery application 139 progresses to box 369.

Assuming that the search configuration discovery application 139 has progressed to box 369, then the search result URL 259 (FIG. 3) of the search result network page 256 (FIG. 3) is examined to determine whether keyword pairs exist that identify search terms 266 therein. If so, then the search configuration discovery application 139 progresses to box 373. Otherwise, the search configuration discovery application 139 progresses to box 376. In box 373, the search result URL 259, keyword, and delimiter are stored in a respective search configuration 136 in association with the respective network site 173. Thereafter, the search configuration discovery application 139 progresses to box 366.

Reverting back to box 376, assuming that the search terms 266 cannot be obtained from the search result URL 259, then in box 376 the search configuration discovery application 139 determines whether search terms 266 can be obtained from a search text box 263 (FIG. 3) associated with the search result network page 256. To this end, a search element identifier associated with the search text box 263 may be identified within a Document Object Model (DOM) associated with the search result network page 256. If the search terms 266 can be obtained from a search text box 263, then the search configuration discovery application 139 proceeds to box 373 to store the search element identifier associated with the search text box 263 for future reference in obtaining search terms 266 from search result network pages 256 associated with the given network site 173.

Thereafter, the search configuration discovery application 139 proceeds to box 366. However, assuming that it is not possible to obtain search terms 266 from a search text box 263 of the search result network page 256 in box 376, then the search configuration discovery application 139 proceeds to box 379. In box 379, the network site 173 may be queued up for manual discovery of a search configuration 136. Thereafter, the search configuration discovery application 139 progresses to box 366.

In box 366, it is determined whether the last potential search text box has been examined in the current search result network page 256. If not, then the search configuration discovery application 139 progresses to box 383 in which the application simulates the entry of search terms 266 in the next potential search text box and solicits a response from the network site 173. Thereafter, the search configuration discovery application 139 progresses to box 363. Thus, the search configuration discovery application 139 will progress through each potential search text box until it finds the search text boxes within which searches are performed so that it can determine how search terms 266 can be obtained from the resulting search result network pages 256.

Figure 5:
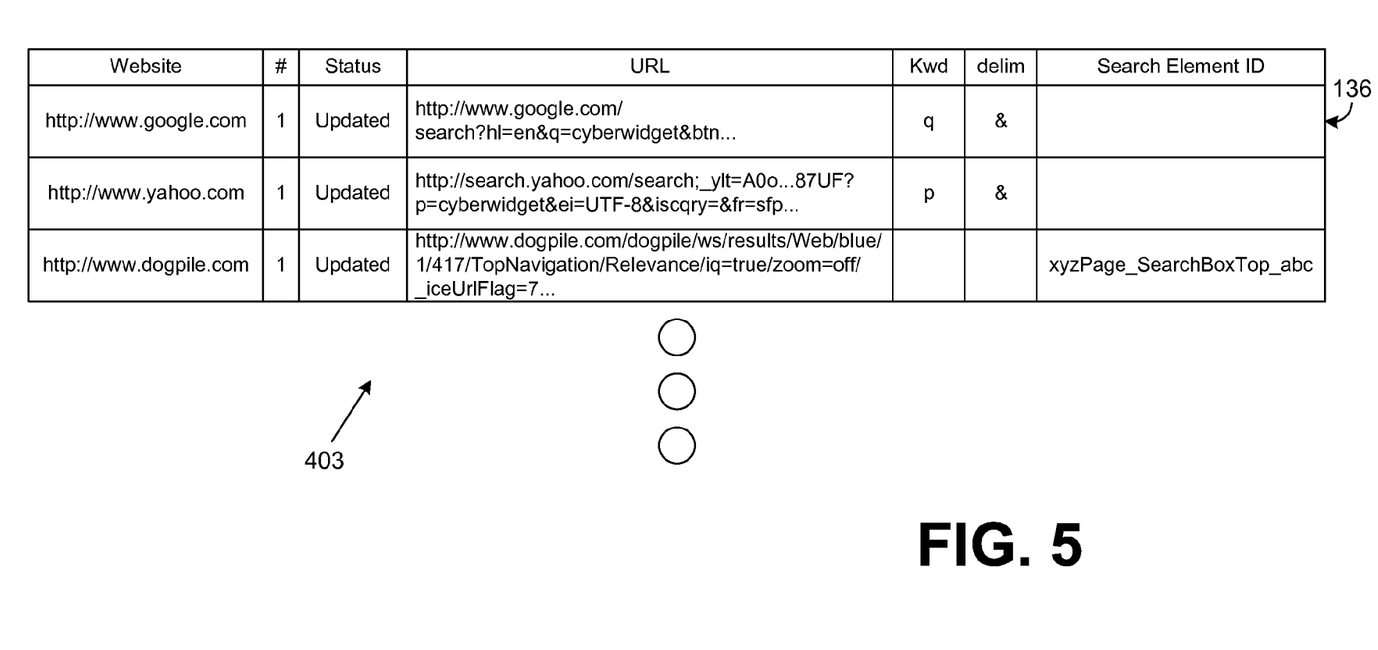
FIG. 5 is a drawing of one example of a search configuration table used for the storage of search configurations identified, for example, by the search configuration discovery application of FIG. 4 according to an embodiment of the present disclosure.

With reference to FIG. 5, shown is one example of a search configuration table 403 that includes each of the search configurations 136 (FIG. 1) stored in the data store 129 (FIG. 1) or on a client 106 (FIG. 1) after it has been downloaded from the data store 129 (FIG. 1) of the server 103 (FIG. 1). Each row includes a network site address such as a website address that includes the top level domain of a given network site 173 (FIG. 1) upon which searching may be performed. When a user downloads the network page associated with the top level domain, then the search configuration 136 associated with such domain may be identified based upon the network site 173 indicated. The "number" field indicated by the symbol "#" indicates which search text box within a given search result network page 256 (FIG. 3) is associated with the respective search configuration 136. This refers to situations where multiple search text boxes are included in a given network page for a given network site 173.

Each search configuration 136 also includes a "status" field that indicates whether the search configuration 136 has been successfully updated or whether an error has occurred during an attempt to obtain a search configuration 136 as described above. The status field may also indicate other states associated with a given search configuration 136. For example, it may be that a given network site 173 has changed the way the search terms 266 (FIG. 3) are expressed in a search result such that they cannot be extracted from the search result URL 259 (FIG. 3) or from a search text box within the search result network page 256. In such case, the information for the respective search configuration 136 will no longer be valid. The status field may indicate whether a given search configuration 136 is valid in this respect.

Each search configuration 136 also includes an example search result URL 259 from the respective network site 173 for situations where the search terms 266 can be extracted from the search result URL 259. For example, the URL of a test search is included in the search configuration 136. Also, "keyword" and "delimiter" fields are included to indicate the keyword and delimiters existing within the search result URL 259 as indicated.

In addition, a "Search Element ID" field is included so that the search element identifier associated with a search text box 263 of a search result network page 256 may be specified. This facilitates identification of the search terms 266 within a Document Object Model (DOM) of a given network page. In addition, other information may be stored with respect to each search configuration 136.

Figure 6:
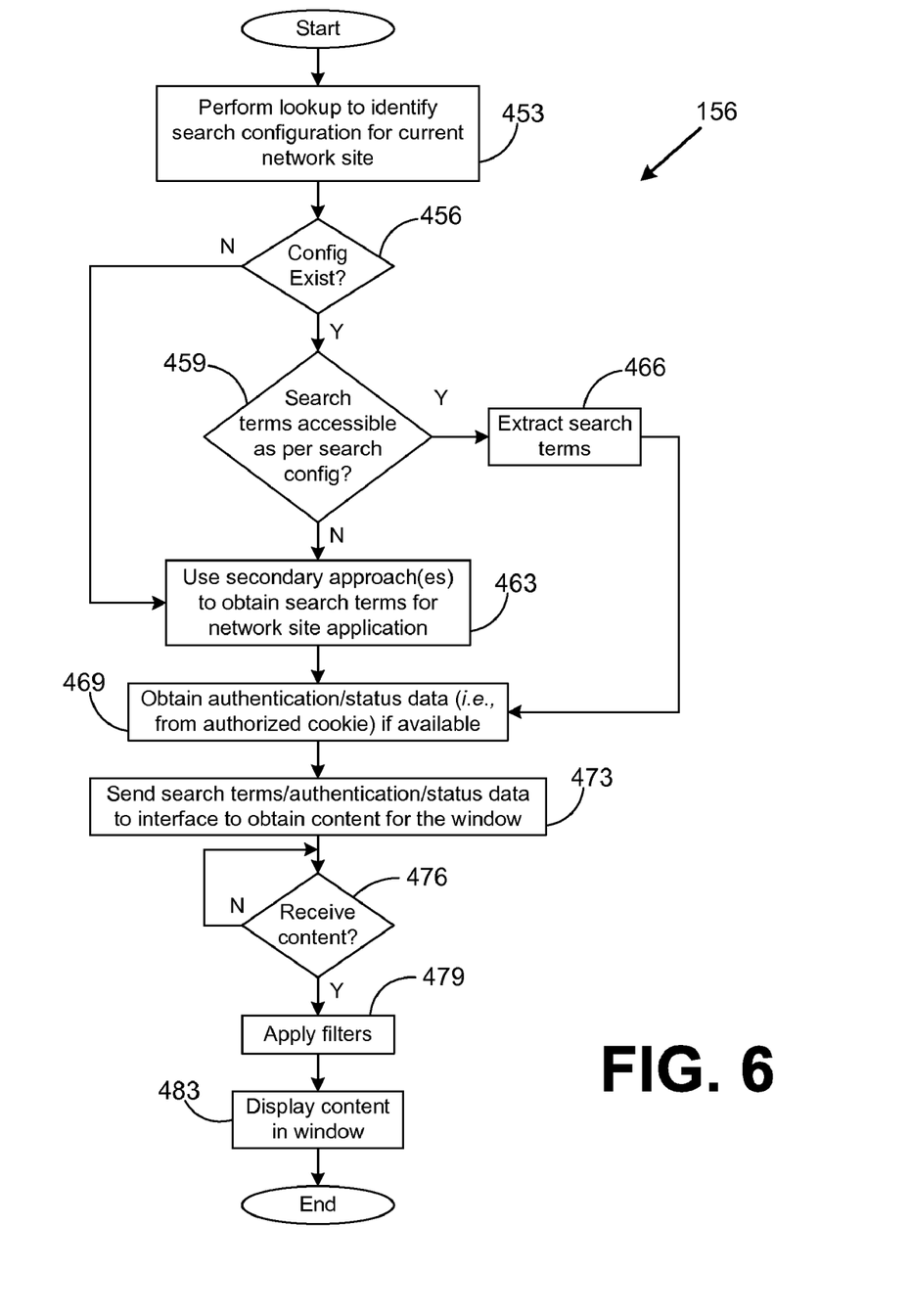
FIG. 6 is a flowchart of one example of an application that is employed to generate a portion of the user interface of FIG. 3 according to an embodiment of the present disclosure.

Referring next to FIG. 6, shown is a flowchart that provides one example of the operation of the plug-in application 156 (FIG. 1) according to an embodiment of the present disclosure. Alternatively, the flowchart of FIG. 6 may be viewed as depicting steps of an example of a method implemented in the client 106 (FIG. 1) to obtain search terms 266 (FIG. 3) used on network sites 173 (FIG. 1) based on respective search configurations 136 (FIGS. 1 and 5).

The flowchart of FIG. 6 shows a portion of the plug-in application 156 that is implemented upon an occurrence of an event that would require a change in the content displayed within the window 169 (FIG. 3). Such an event may comprise, for example, the startup of the browsing application 153 (FIG. 1), a network page load event, or a browsing task change event. Such events may also comprise the implementation of a new search or the entry of a different network site 173 into the browsing application 153 (FIG. 1), etc.

Thus, in box 453, the plug-in application 156 performs a lookup to identify a search configuration 136 for the current network site 173 accessed by the browsing application 153. Alternatively, the plug-in application 156 may send a request to the server 103 (FIG. 1) for the search configuration 136 for the current network site 173, or may take other action as described above. In box 456, the plug-in application 156 determines whether a search configuration 136 exists based on the lookup function or based upon a response from the server 103. If the search configuration 136 exists, then the plug-in application 156 progresses to box 459. Otherwise, the plug-in application 156 proceeds to box 463 as shown.

In box 459, the plug-in application 156 determines whether search terms 266 are accessible from a respective search result as per the search configuration 136 identified in box 453. If so, then the plug-in application 156 progresses to box 466 to extract the search terms 266. To this end, the search terms 266 may be obtained from a search result URL 259 or from a search text box 263 in a search result network page 256 as described above. Thereafter, the plug-in application 156 progresses to box 469.

Assuming that the plug-in application 156 reaches box 463, then various secondary approaches may be employed to obtain search terms 266 from a given network site 173. Such approaches may comprise, for example, the use of any one of a number of network page analysis techniques such as identifying key terms on the network page based upon the frequency of such terms, etc. Thereafter, the plug-in application 156 progresses to box 469. Alternatively, the functionality of box 463 may be omitted from the flow chart of FIG. 6, where the current content displayed in the window 169 is maintained. In such case, the plug-in application 156 may end if no search configuration 136 exists for a given network site 173 as determined in box 456.

In additional alternatives, the plug-in application 156 may facilitate the selection of text or images from a network page of a network site 173 that can then be dragged and dropped onto the window 169. In response thereto, the plug-in application 156 may send the text or image(s) to the plug-in interface application 126. The server 103 may include functionality that is embodied in a separate application or is part of the network site 123 or plug-in interface application 126 configured to analyze the text or images to determine relevant content to present in the window 169 based on such text or images. For example, an image may be of a product, where the image includes a name of the product. Such an image may be analyzed to identify the name of the product. Thereafter, content may be identified relevant to such product. Such content may actually embody an offer for sale of the product itself.

In box 469, the plug-in application 156 obtains authentication and/or other identification data associated with a user if available. Such data may be obtained from a cookie 159 or other data in the client 106 as described above. Such data may uniquely identify the user based upon a code or other identifier(s) such as a combination of a user name and password. Alternatively, information about the physical location of the user may be obtained. Specifically, in some embodiments, data within the client 106 that indicates a country or other geographical location where the client 106 is located may be accessed. In some embodiments, the geographical location may be determined based at least upon an IP address of the client system or a billing or shipping address associated with the user. In other embodiments, the geographical location could be determined using geo-location techniques such as, but not limited to, global positioning systems or triangulation techniques. Thereafter, in box 473, the search terms 266 and any authentication data obtained are sent to the plug-in interface application 126 (FIG. 1) to obtain content for the window 169. Note that the geographical location of the client 106 sending the search terms 266 and authentication data may be included in the message sent to the plug-in interface application 126 in accordance with various communications protocols such as the Internet Protocol, etc. Such geographical information may be taken into account when identifying the content to send back to the client 106. For example, for the same search terms, the content sent to a client 106 in Dallas, Tex. may differ from the content sent to a client 106 in London, England due to cultural differences.

Then, in box 476 the plug-in application 156 waits to receive the content from the server 103 (FIG. 1). Once the content has been received, then in box 479 the plug-in application 156 applies filters to the content to ensure that they are proper. Such filters may comprise business rules generated for the user, etc. Next, in box 483 the new content is displayed in the window 169. Thereafter, the plug-in application 156 ends.

Figure 7:
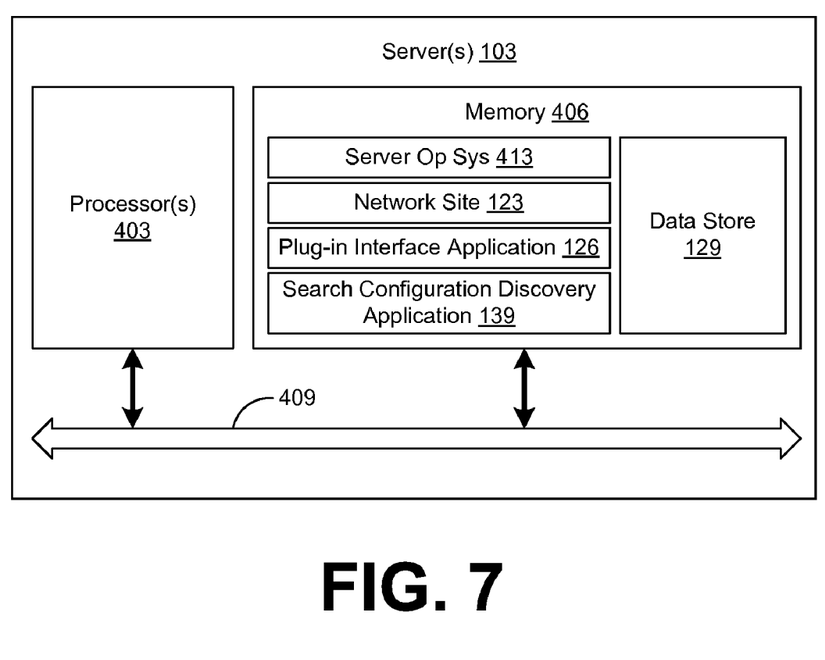
FIG. 7 is a drawing of one example of a server used in the data communications network of FIG. 1 according to an embodiment of the present disclosure.

Referring next to FIG. 7, shown is a schematic block diagram of one example of the server 103 according to an embodiment of the present disclosure. The server 103 includes a processor circuit, for example, having a processor 403 and a memory 406, both of which are coupled to a local interface 409. To this end, the server 103 may comprise, for example, a server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are a server operating system 413, applications that generate the network site 123, the plug-in interface application 126, and the search configuration discovery application 139, and potentially other applications. Also, stored in the memory 406 is the data store 129 in which the network site data 133 (FIG. 1), the search configurations 136 (FIG. 1), and other data may be stored so as to be accessible to the server 103.

With reference to FIG. 7, it is understood that there may be other applications that are stored in the memory 406 and are executable by the processor 403 as can be appreciated. Also, other data may be stored in the memory 406 and accessed by the processor 403. Where any component discussed herein is implemented in the form of software, any one of a number of programming languages may be employed such as, for example, C, C++, Java, Java Script, Perl, Python, Flash, or other programming languages.

A number of software components are stored in the memory 406 and are executable by the processor 403 as mentioned above. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories etc. The local interface 409 may comprise additional systems designed to coordinate this communication, including, for example, performing load balancing. The processor 403 may be of electrical or of some other available construction.

Although the various applications such as the plug-in application 156, the search configuration discovery application 139, and/or other applications described above are embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts FIGS. 4 and 6 show the functionality and/or operation of an example implementation of the plug-in application 156 and the search configuration discovery application 139 described above. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 4 and 6 show a specific order of execution, it is understood that the order of execution may differ from that which is depicted. For example, the order of execution of two or more blocks may be scrambled relative to the order shown. Also, two or more blocks shown in succession in FIGS. 4 and 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the plug-in application 156, the search configuration discovery application 139, and/or other applications described above comprise software or code, each can be embodied in any computer-readable medium for use by or in connection with an instruction execution system such as, for example, a processor in a computer system or other system. In this sense, the same may comprise, for example, statements including instructions and declarations that can be fetched from the computer-readable medium and executed by the instruction execution system. In the context of the present disclosure, a "computer-readable medium" can be any medium that can contain, store, or maintain the plug-in application 156, the search configuration discovery application 139, and/or other applications described above for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
accessing a plurality of network sites via a search configuration discovery application executed in a server; and
for each of the network sites, performing, in the server, the steps of:
determining if a first search text box exists in a network page of the network site;
automatically performing a search using a search term in the first search text box if the first search text box exists in the network page;
automatically determining if the search term can be identified in association with a search result network page generated from the search by:
determining if a search term is embodied in a keyword pair in an associated search result network page uniform resource locator (URL);
determining if the search term is embodied in a second search text box associated with the search result network page when the search term is not embodied in a keyword pair in the search result network page URL;
storing in the server a search configuration for each of the network sites, the search configuration indicating where the search term can be identified in the network page resulting from a search performed on the network site when the search term can be identified in association with the search result network page,
wherein the search configuration comprises characters identifying the keyword pair when the search term is embodied in a keyword pair in the search result network page URL; and
wherein the search configuration further comprises a search element identifier corresponding to the second search text box when the search term is embodied in the second search text box associated with the search result network page;
flagging a network site for manual determination of a search configuration upon a failure to automatically determine whether a search term can be identified in association with a search result network page generated from the search; and
periodically updating each search configuration for each of the network sites.

2. The method of claim 1, wherein the step of determining if the search term is embodied in the keyword pair in the associated search result network page URL further comprises identifying a keyword associated with the keyword pair and a delimiter in the URL.

3. The method of claim 2, wherein the step of storing the search configuration for each of the network sites further comprises storing the keyword and the delimiter in association with a URL associated with the network site.

4. The method of claim 1, wherein the step of storing the search configuration for each of the network sites further comprises storing the search element identifier corresponding to the second search text box in association with a URL associated with the network site.

5. A system comprising:
at least one server; and
a search configuration discovery application executable in the at least one server, the search configuration discovery application comprising:
logic that accesses a plurality of network sites via a search configuration discovery application executed in a server; and
for each of the network sites:
logic that determines whether a first search text box exists in a network page of the network site;
logic that automatically performs a search using a search term in the first search text box if the first search text box exists in the network page;
logic that automatically determines whether the search term can be identified in association with a search result network page generated from the search, the logic that automatically determines further comprising:

logic that determines whether a search term is embodied in a keyword pair in an associated search result network page uniform resource locator (URL);

logic that determines whether the search term is embodied in a second search text box associated with the search result network page when the search term is not embodied in a keyword pair in the search result network page URL;

logic that stores in the server a search configuration for each of the network sites, the search configuration indicating where the search term can be identified in the network page resulting from a search performed on the network site when the search term can be identified in association with the search result network page, wherein the search configuration comprises characters identifying the keyword pair when the search term is embodied in a keyword pair in the search result network page URL, and wherein the search configuration further comprises a search element identifier corresponding to the second search text box when the search term is embodied in the second search text box associated with the search result network page; and logic that flags a network site for manual determination of a search configuration upon a failure to automatically determine whether a search term can be identified in association with a search result network page generated from the search; and logic that periodically updates each search configuration for each of the network sites.

6. The system of claim 5, wherein the logic that determines whether the search term is embodied in the keyword pair in the associated search result network page URL further comprises logic that identifies a keyword associated with the keyword pair and a delimiter in the URL.

7. The system of claim 5, wherein the logic that stores the search configuration for each of the network sites further comprises logic that stores the keyword and the delimiter in association with a URL associated with the network site.

8. The system of claim 5, wherein the logic that stores the search configuration for each of the network sites further comprises logic that stores the search element identifier corresponding to the second search text box in association with a URL associated with the network site.

* * * * *